(12) United States Patent
Gennaro et al.

(10) Patent No.: US 6,292,897 B1
(45) Date of Patent: *Sep. 18, 2001

(54) UNDENIABLE CERTIFICATES FOR DIGITAL SIGNATURE VERIFICATION

(75) Inventors: Rosario Gennaro, New York, NY (US); Hugo Mario Krawczyk, Haifa (IL); Tal D. Rabin, Riverdale, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,343

(22) Filed: Nov. 3, 1997

(51) Int. Cl.[7] .................................................. H04L 9/32
(52) U.S. Cl. ........................... 713/175; 713/180; 713/156
(58) Field of Search ................................ 380/23, 21, 285; 713/156, 155, 175, 180

(56) References Cited

U.S. PATENT DOCUMENTS

| 4,947,430 | 8/1990 | Chaum . | |
|---|---|---|---|
| 5,420,927 | * 5/1995 | Micali | 380/23 |
| 5,493,614 | * 2/1996 | Chaum | 380/30 |
| 5,724,425 | * 3/1998 | Chang et al. | 380/25 |

FOREIGN PATENT DOCUMENTS

| 781003 | * 6/1997 | (EP) | H01L/9/32 |

OTHER PUBLICATIONS

Chaum, D. "Zero–Knowledge Undeniable Signatures." Proceedings of Eurocrypt '90. 1990.*

Voydock, V. and S. Kent. "Security Mechanisms in High–Level Network Protocols." Communications of the ACM. 1983.*

Mulqueen, John T. Premenos Goes After IPO Gold. CommunicationsWeek, n575, p 93(2). Sep. 18, 1995. Reproduced from Dialog Web ™.*

Krawczyk, H. and T. Rabin. "Chameleon Hashing and Signatures." Internet—http://www.research.ibm.com/security/projects.html, Oct. 1997.*

Michael O. Rabin, "Digitalized Signatures", Hebrew University of Jerusalem, Massachusetts Institute of Technology, Jul. 1976, p. 155–166.

R. L. Rivest, et al., "A Method for Obtaining Digital Signatures and Public–Key Cryptosystems", Communications of the ACM, vol. 21, No. 2, Feb. 1978, pp. 120–124.

David Chaum, "Undeniable Signatures", Centre for Mathematics and Computer Science, pp. 212–214.

* cited by examiner

*Primary Examiner*—Gilberto Barron, Jr.
*Assistant Examiner*—Anthony DiLorenzo
(74) *Attorney, Agent, or Firm*—McGuireWoods, LLP; Louis P. Herzberg

(57) ABSTRACT

A signer uses an undeniable signature scheme to sign his public key to thereby create an "undeniable certificate" which can be used to verify the signer's digital signature on any message signed using the signer's corresponding private key. Hence, once the undeniable certificate is received by the recipient, the recipient and the signer engage one time in a confirmation protocol or denial protocol to the satisfaction of the recipient that the undeniable certificate has in fact been signed by the signer thus certifying signer's public key. Thereafter, the recipient can use the certified public key to verify any documents signed by the signer with no further interaction with the signer. However, third parties are precluded from verifying the signer's signature since they do not possess the confirmed undeniable certificate and corresponding public key. Digital signatures can now be verified between two parties using a public key as in traditional digital signatures but which avoids verifiability by third parties.

13 Claims, 4 Drawing Sheets

UNDENIABLE CERTIFICATES FOR DIGITAL SIGNATURE VERIFICATION

BACKGROUND OF THE INVENTION

1. Field of the Invention

The present invention generally relates to certificates for digital signature verification and, more particularly, to a method for undeniably certifying a public signing key for a recipient to verify digital signatures which precludes third parties from verifying the signatures yet does not require the original signer's cooperation with the recipient on each signature except for an initial verification.

2. Description of the Related Art

With the proliferation of electronic mail (e-mail), electronic contracts, electronic funds transfer, and the increasing reliance on on-line communication by the business community at large, the ability to authenticate documents and verify electronic or digital signatures is crucial.

Techniques have been developed for electronic authentication, for example, by using public key (PK) signatures which comprise a pair of keys associated with a particular signer. Namely, a private signing key and a public verification key. The message to be signed is represented as a number as is the signature itself. A signing algorithm is used to compute the signature using the user's private key. The signature can thereafter be verified as being attached to a particular message using the corresponding public verification key. Since the signer's private key is necessary to compute the digital signature, the forgery problem is thought to be eliminated. The ability for any third party using the corresponding public key to verify the validity of a signature is usually seen as the basis for the "non-repudiation" aspect of digital signatures, and their main source of attractiveness. However, this universal verifiability (or self-authenticating) property of digital signatures is not always a desirable property.

Such is the case of a signature binding parties to a confidential agreement, or of a signature on documents carrying private or personal information. In these cases limiting the ability of third parties to verify the validity of a signature is an important goal. However, if third party verification is limited to such an extent that it cannot be verified by, say, a court in case of a dispute then the value of digital signatures is seriously questioned. Thus, the question is raised of how to generate signatures which limit the verification capabilities yet without compromising the central property of non-repudiation.

To this end, the concept of "undeniable signatures" has been developed. The first example of undeniable signatures appeared in a paper by Michael Rabin, Digitized Signatures, Foundations of Secure Computation, Academic Press, 1978, herein incorporated by reference. When the authenticity of a message and its "undeniable signature" are called into question, the alleged signer's cooperation is required to verify the signature. That is, the alleged signer must be called upon to engage in a "confirmation protocol". On the other hand, the signer can prove that a digital signature is a forgery by engaging in a "denial protocol". This method requires that if on a specific message and signature the confirmation protocol reveals that the signature is a valid signature then using the same input to the denial protocol would not output that it is a forgery.

The protection of signatures from universal verifiability with the undeniable signature method is not only justified by confidentiality and privacy concerns but it also opens a wide range of applications where verifying a signature is a valuable operation in itself. For example, undeniable signatures are useful to software companies or other electronic publishers that use signature confirmation as a way to provide proof of authenticity on their products only to paying customers.

There are three main components to undeniable signature schemes. The signature generation algorithm (including the details of private and public information), the confirmation protocol, and the denial protocol. Signature generation is much like a regular signature generation, namely, an operation is performed by the signer on the message which results in a string that is provided to the requester of the signature. The confirmation protocol is usually modeled after an interactive proof where the signer acts as the prover and the holder of the signature as the verifier. The input to the protocol is the message and its alleged signature (as well as the public key information associated with the signer).

The validity of an undeniable signature can be gathered by anyone with whom the signer is willing to cooperate by issuing a challenge to the signer and testing the signer's response. If the results of the confirmation protocol is positive, then there is a high probability that the signature is valid. If on the other hand, the results of the confirmation protocol is negative then there is a high probability that the signature is a forgery. For more information on undeniable signatures, the reader is invited to review U.S. Pat. No. 4,947,430 to Chaum, herein incorporated by reference.

Similarly, U.S. Pat. No. 5,493,614 to Chaum, herein incorporated by reference, discloses undeniable signature scheme called private signature and proof system. In this system, a signature or proof can be sent as a single message. This solution requires prior knowledge of the intended recipient for a signatures proof.

A drawback to undeniable signature schemes is that they require the cooperation of the signer to prove a signature. There is a real need in the art of undeniable signatures to limit the amount of interaction and computational effort required to verify signatures. Namely, it is desirable to have a method by which a recipient can verify the validity of several signatures non-interactively and efficiently, after a minimal interaction with the signer.

SUMMARY OF THE INVENTION

It is therefore an object of the present invention to allow a recipient to verify a signer's digital signature on one or more documents, without requiring the signer's repeated cooperation, using an undeniable certificate once confirmed by the signer.

It is yet a further object of the present invention to preclude unwanted third parties from verifying a digital signature.

According to the invention a signer uses an undeniable signature scheme to sign his public key to thereby create an "undeniable certificate" which can be used to verify the signer's digital signature on any document signed using the signer's corresponding private key. Hence, once the undeniable certificate is received by the recipient, the recipient and the signer engage one time in a confirmation protocol or denial protocol to the satisfaction of the recipient that the undeniable certificate has in fact been signed by the signer and thus comprises the signer's certified public key. Thereafter, the recipient can use the certified public key to verify any documents signed by the signer. However, third parties are precluded from verifying the signer's signature since they do not possess a convincing confirmation of the undeniable certificate and corresponding public key.

A great advantage to this method lies in the fact that the signer can sign documents which can be verified by his public key as in traditional digital signatures. Yet this method requires less expensive computations as are associated with undeniable signature schemes. Further, the use of undeniable signatures in the past required the signer's cooperation to engage in a confirmation or denial protocol for each document to confirm his signature. Instead, the present invention only requires the signer to undeniably certify his public key once. Documents signed thereafter may be verified by the recipient holding the undeniable certified public key without the need of the signer's cooperation.

Those skilled in the art will recognize that the undeniably certified public key, can be a key for any digital signature scheme, for example, group signatures, blind signatures, fail-stop signatures, and the like.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
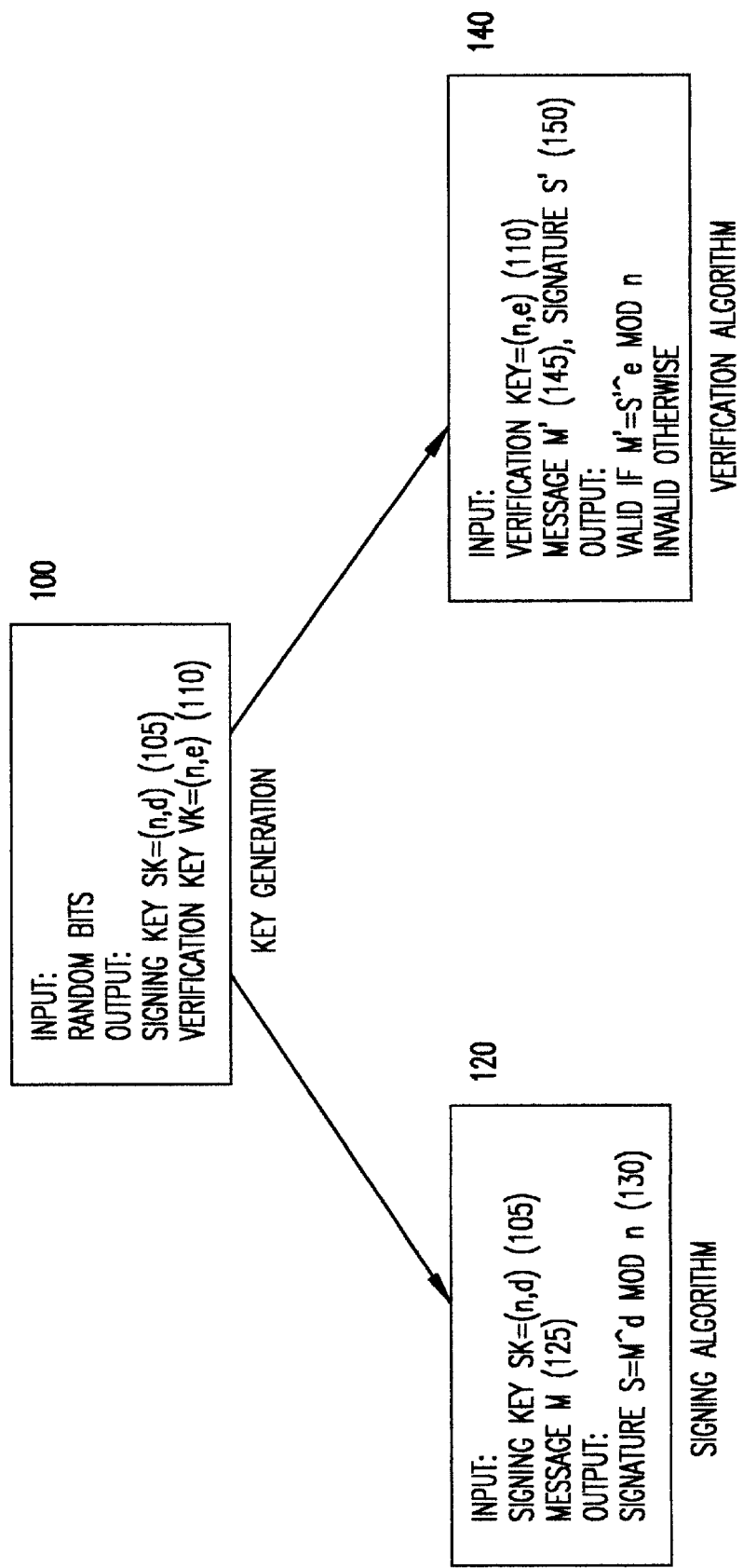
FIG. 1 is block diagram of a traditional digital signature scheme.

Referring now to the drawings, and more particularly to FIG. 1, there is shown a block diagram describing a standard digital signatures. More particularly, this specific implementation of digital signatures is known in the art as "RSA" after the authors of the paper Rivest et al., A Method for Obtaining Digital Signatures and Public Key Cryptosystems, Communications of the ACM, vol. 21, No. 2, February 1978, herein incorporated by reference.

As shown in FIG. 1 there are three main components to RSA; namely, key generation 100, the signing algorithm 120, and the verification algorithm 140. The key-generation 100 represents the generation of a digital signature key pair associated with a signer, where SK 105 is the private signing key used by the signer to generate signatures, and VK 110 is the public verification key used to verify that a signature was generated under the signing key SK. The secret key is computed by generating two large prime numbers p and q and computing their product n=p*q. The secret key is a random value d in $Z^*_{(p-1)(q-1)}$. Thereafter, a value e is generated by finding the value which satisfies that ed=1 mod (p-1)(q-1). The private signing key SK 105 is the pair (n, d) and the public verification key VK 110 is the pair (n, e).

Once the public and private keys are generated, the signing algorithm 120 is used to generate a signature S 130 on a message M 125 using the private signing key SK 105. In RSA the signature S is computed by raising the message M to the secret power d 105 as $S=M^d$ mod n.

To verify that the message M was in fact signed by the signer, the verification algorithm 140 receives the public verification key VK 110, the signed message M' 145, and an alleged signature S' 150, and verifies that the signature is a valid signature on the message M' under the verification key VK. In RSA the verification is carried out by checking if $M'=S'^e$ mod n. If this equation holds true, then the signature is a valid signature.

Figure 2:
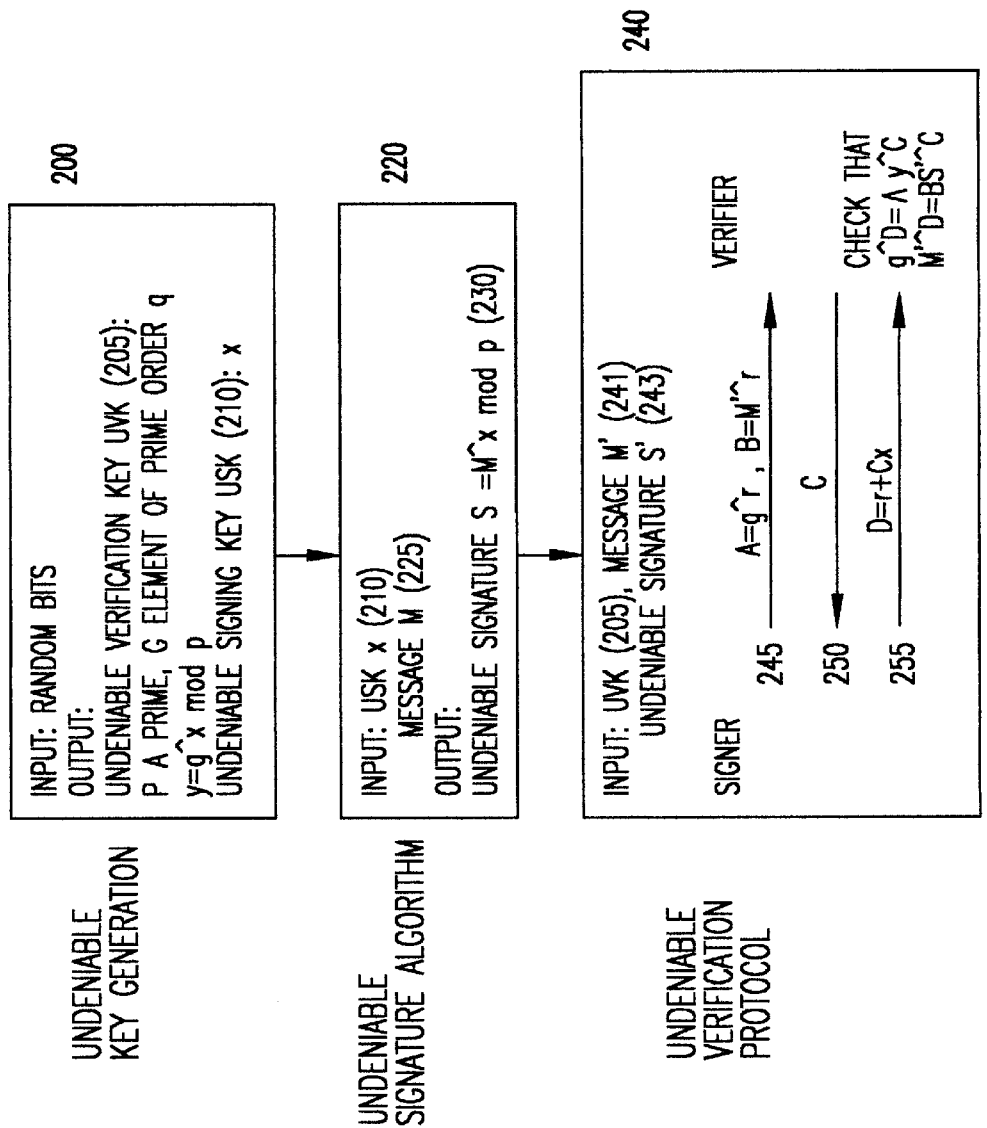
FIG. 2 is a block diagram example of a traditional undeniable signature scheme

FIG. 2 describes an undeniable signature scheme, such as that described by Chaum in U.S. Pat. No. 4,947,430, supra. Again, this undeniable signature scheme comprises three main parts; namely, undeniable key generation 200, an undeniable signature algorithm 220, and an undeniable verification protocol 240. The undeniable key generation 200 represents the generation of an undeniable signature key pair associated with a particular signer. The undeniable signing key USK 210 is the private signing key, used by the signer to generate undeniable signatures. Likewise, the undeniable verification UVK 205 is the corresponding undeniable verification key, which is used to verify undeniable signatures. However, in contrast to traditional digital signatures described above, for undeniable signatures the signer is needed in order to verify a signature using an undeniable verification protocol 240 since this is what precludes third parties from verifying the signature. The UVK 210 comprises a large prime number p such that p-1 is divisible by a large prime number q. g is an element of order q in $Z_p^*$, y is an element in the subgroup generated by g, $y=g^x$, The value x is the secret key USK 210. The undeniable signature algorithm 220 is used by the signer to generate an undeniable signature S 230 on a message M 225 using the private undeniable signing key USK 210. The undeniable signature S is computed by raising M to the secret power x 120 as $S=M^d$ mod p.

To verify the undeniable signature S, the recipient and the signer must engage in an undeniable verification protocol 240. The undeniable verification protocol 240 receives a verification key UVK 205, a message M' 241, and an alleged undeniable signature S' 243, and verifies that the signature S' is a valid undeniable signature on the message M' under the undeniable verification key UVK 205. In this specific example verification is done using a challenge/response mechanism at the end of which the verifier interacting with the signer is convinced that the signature is valid. Specifically, the signer chooses a random r between 0 and q and sends to the recipient or verifier the values $A=g^r$ mod p and $B=M'^r$ mod p 245. The verifier replies with a random number C between 0 and q 250. The signer replies back with the value D=r+Cx modulo q 255. The verifier checks that $g^D$ mod $p=Ay^C$ mod p and $M'^D=B\ S'^C$ mod p. If both equations are satisfied the verifier accepts the signature S'.

Figure 3:
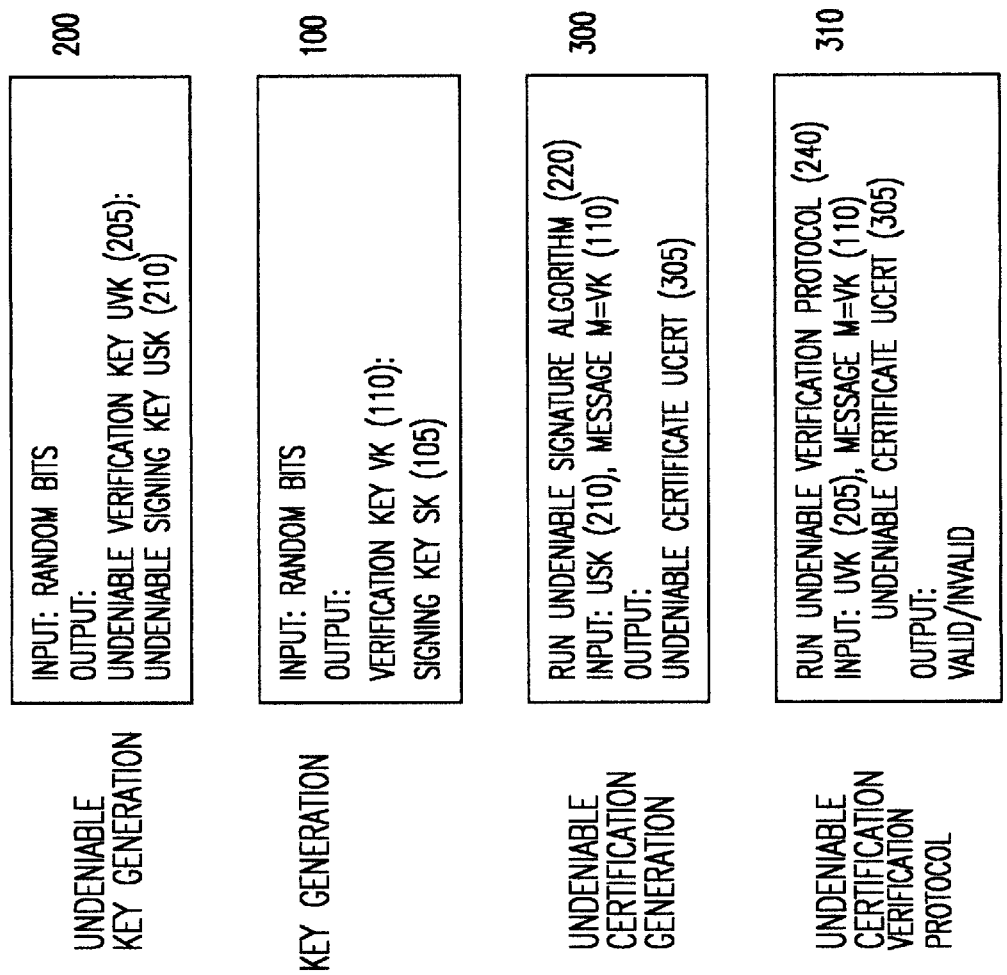
FIG. 3 is a block diagram of an undeniable certificate generation protocol according to the present invention.

Referring now to FIG. 3, the present invention uses an undeniable signature, such as that discussed in FIG. 2, to "certify" a standard digital signature key such as that described in FIG. 1, to create an undeniable certificate which, when verified by a recipient can be used to verify signatures on other documents signed by the signer. The signature on the key (the "certificate") is undeniable, thus transitively the signatures generated under this key are also undeniable.

The generation of undeniable signatures according the present invention is first described by the generation of the certificate, followed by the description of the generation of undeniable signatures.

The undeniable key generation algorithm 200 generates a key pair (USK, UVK), (210, 205) for an undeniable signature scheme. This could be the undeniable signature scheme discussed in Chaum, chameleon signatures (discussed below), or other undeniable signature scheme. Similarly, a key generation algorithm 100 generates a key pair (SK, VK)

(110, 105) for a standard digital signature scheme, such as RSA or chameleon signatures. Thereafter, the undeniable certificate generation algorithm 300 is used to produce the undeniable certificate (UCERT) 305 by the signer signing the verification key VK 105 with the undeniable signature key USK 210. In other words, the message M to be signed is VK 110. This is done using the undeniable signature algorithm 220 with the appropriate inputs.

The recipient and the signer thereafter engage in a one time undeniable certificate protocol 310 to validate the certificate UCERT 305. This is done using the Undeniable Verification Protocol 240, discussed above in FIG. 2, where the message to be verified is the key VK 110 and the signature is the certificate UCERT 305. The verification protocol 240 outputs whether the signature on the verification key VK is valid or invalid and, hence, whether the undeniable certificate is valid or invalid.

Figure 4:
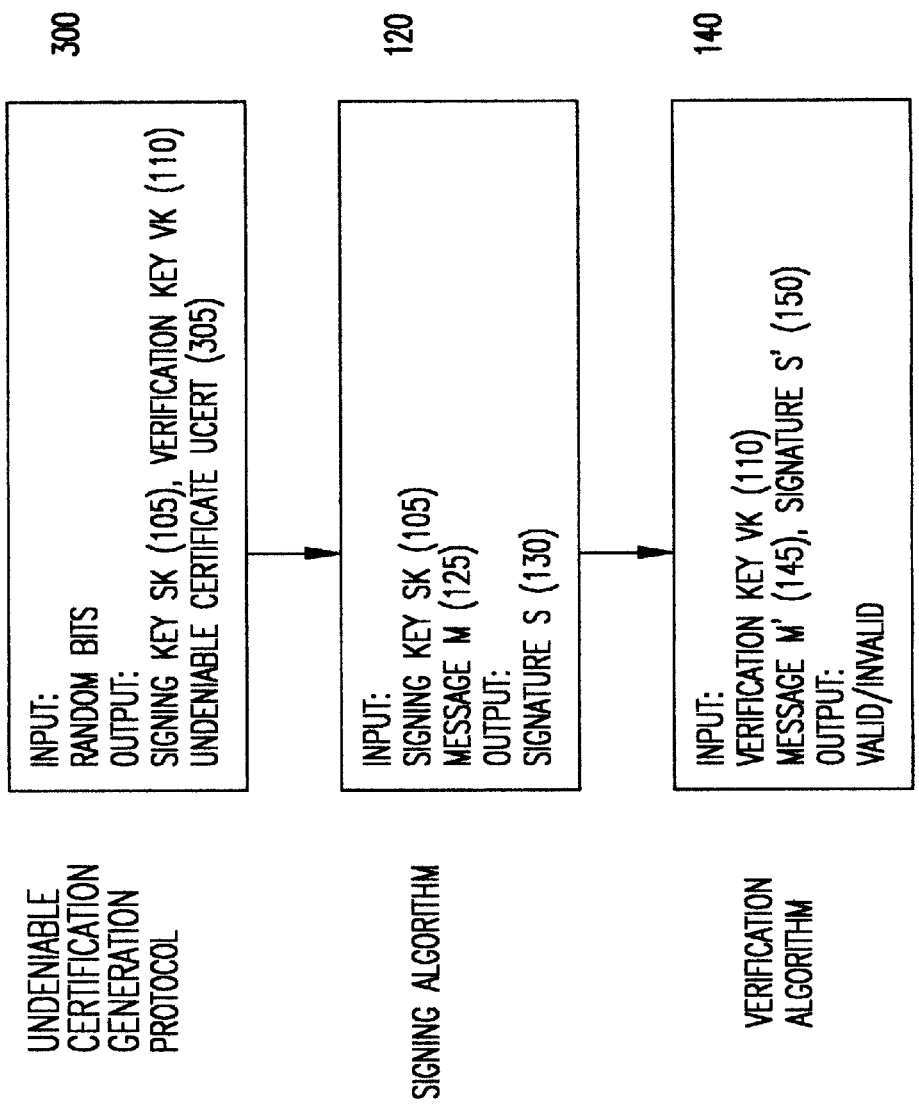
FIG. 4 is a block diagram protocol showing undeniable signatures using undeniable certificates according to the present invention.

Referring now to FIG. 4, once the recipient has verified the undeniable certificate, the recipient can use the undeniable certificate UCERT to verify other documents signed by that particular signer. In operation, the signer and recipient establish an undeniable certificate using Undeniable Certificate Generation Protocol 300 for a verification key VK 110. Then the signer using the signing algorithm 120 signs a message M 125 under the private signing key SK 105 corresponding to the verification key VK 110 certified in the previous step. This creates the signature S 130. The recipient verifies, using the standard verification algorithm 140, whether the alleged signature S' 150 is a signature on the message M' 145 under the verification key VK 110.

Hence, according the invention, once the undeniable certificate UCERT comprising the signer's verified public signing key is received and verified by the recipient, the recipient can use the certified public key to verify any documents signed by the signer. However, third parties are precluded from verifying the signer's signature since they do not possess the undeniable certificate and corresponding public key.

Following is an example of chameleon signature scheme:

We introduce chameleon signatures that provide with an undeniable commitment of the signer to the contents of the signed document (as regular digital signatures do) but, at the same time, do not allow the recipient of the signature to disclose the contents of the signed information to any third party without the signer's consent. These signatures are closely related to "undeniable signatures", but chameleon signatures allow for simpler and more efficient realizations than the latter. In particular, they are essentially non-interactive and do not involve the design and complexity of zero-knowledge proofs on which traditional undeniable signatures are based. Instead, chameleon signatures are generated under the standard method of hash-then-sign. Yet, the hash functions which are used are chameleon hash functions. These hash functions are characterized by the non-standard property of being collision-resistant for the signer but collision tractable for the recipient.

We present simple and efficient constructions of chameleon hashing and chameleon signatures. The former can be constructed based on standard cryptographic assumptions (such as the hardness of factoring or discrete logarithms) and have efficient realizations based on these assumptions. For the signature part we can use any digital signature (such as RSA or DSS) and prove the unforgeability property of the resultant chameleon signatures solely based on the unforgeability of the underlying digital signature in use.

1 Introduction

Typical business relationships between companies or individuals involve commitments assumed by the parties in the form of agreements and contracts. Digital signatures represent the main cryptographic tool to provide the non-repudiation property required in case of possible disputes. However, digital signatures also allow any party to disclose (and prove!) the other party's commitment to an outsider. This may be undesirable in many business situations. For example, disclosing a signed contract to a journalist or a competitor can benefit one party but jeopardize the interests of the other; early dissemination of confidential agreements can be used to achieve illegitimate earnings in the stock market; a losing bidder may want to prevent disclosure of his bid even after an auction is over. These, and many other, examples show how privacy, confidentiality and legal issues pose the need to prevent the arbitrary dissemination of the contents of some agreements and contracts by third parties or even by the recipient of a signature. Still in all these cases it is essential to preserve the non-repudiation property in the event of legal disputes. In such a case, an authorized judge should be able to determine the validity of a contract, an agreement or commitment.

In order to bridge between the contradictory requirements of non-repudiation and controlled dissemination Chaum and van Antwerpen introduced undeniable signatures [CA89] (which were subsequently the subject of many research works, e.g. [Cha90, BCDP90, DY91, FOO91, Ped91, CvHP91, Cha94, Oka94, Mic96, DP96, JSI96, JY96, GKR97]). We note that this type of interactive signatures was already suggested in 1976 by Michael Rabin based on one-time signatures [Rap78]. The basic paradigm behind this type of signatures is that verification of a signature requires the collaboration of the signer, so that the latter can control to whom the signed document is being disclosed. A crucial requirement for these signatures is that the signature string will be non-transferable, i.e. will not convey any information on the contents of the signed document to anyone except for those parties that engage in some specified protocol directly with the signer. Such a protocol enables the signer to confirm a valid signature or deny an invalid one. To prevent leaking of information these protocols are based on zero-knowledge proofs. As it is natural to expect, the added properties and techniques relative to regular digital signatures also add to the complexity of the schemes, both conceptually and in computational and communication costs.

In this paper we introduce a simple and novel alternative to solve the above problems (i.e., bridging between non-repudiation and controlled disclosure) at a significantly lower cost and complexity. We depart from the interactive zero-knowledge paradigm of undeniable signatures. Instead, we build signatures that are much like regular digital signatures, and follow the traditional approach of hash-then-sign. The main difference between regular signatures and chameleon signatures is in the type of hash functions that we use, namely, chameleon hashing which we introduce shortly. (For the signature itself we can use any common digital signature, like RSA or DSS.)

The basic idea is to build the signature scheme in such a way that a signature provided by a signer S to a recipient R gives R the ability to forge further signatures of S at will. (That is, once R receives a signature of S on a document m he can produce signatures of S on any other document m'.) Clearly, this prevents R from proving the validity of S's signature to a third party as he could have produced such a signature by himself. This raises the question what is the value of such a signature if no one can decide on its validity or invalidity. We render the scheme valuable by providing the signer S with the exclusive ability to prove forgeries. In other words, R can produce forgeries that are indistinguishable from real signatures to any third party, but S can prove the forgery to such a third party if he desires or is compelled (e.g. by force of the law) to do so. Our method is essentially non-interactive. A signature is provided as a string that can (non-interactively) be verified by the recipient, while for denying a false signature, the signer only needs to provide a short piece of information as evidence for the forgery.

We now briefly introduce the main tool in our constructions: chameleon hashing. Its application in our context will be motivated shortly.

1.1 Chameleon Hashing

Chameleon (or trapdoor) hash functions are a non-standard type of collision resistant hash functions. A chameleon hash function is associated with a pair of public and private keys (the latter called a trapdoor) and has the following properties.

1. Anyone that knows the public key can compute the associated hash function.
2. For those who don't know the trapdoor the function is collision resistant in the usual sense, namely, it is infeasible to find two inputs which are mapped to the same output.
3. However, the holder of the trapdoor information can easily find collisions for every given input.

The actual definition of chameleon hashing, presented in Section 2, also adds a requirement on the output distribution of these functions (which, in particular, need to be randomized). The notion of chameleon hashing is closely related to "chameleon commitment schemes" [BCC88] which implicitly induce constructions of chameleon hash functions. (We expand on this relation in Section 2). The name "chameleon" refers to the ability of the owner of the trapdoor information to change the input to the function to any value of his choice without changing the output.

We show several constructions of chameleon hashing based on standard cryptographic assumptions, such as the hardness of factoring or computing discrete logarithms, as well as a general construction based on claw-free pairs of trapdoor permutations [GMR88]. The efficiency of these constructions is similar (or better) to that of regular digital signatures.

1.2 Chameleon Signatures

Why is chameleon hashing worth considering in our context? Consider first the standard practice of applying a regular digital signature (say RSA or DSS) to a collision resistant hashing of a given message (e.g., using the SHA algorithm). Now, replace the standard hash function with a chameleon hash $H_R$ where R (for Recipient) is a party holding the trapdoor information for $H_R$, and for whom the signature is intended. The newly obtained signature scheme has some interesting properties:

1. As in regular digital signatures, the signer S cannot repudiate (or deny) a signature he generated since he cannot find collisions in the hash.
2. The recipient cannot prove to any third party that a given signature of S corresponds to a certain message since R could "open" the signed message in any way he wants using the trapdoor hashing.[2]

[2] In this sense the signature is like an appended message-independent signature (e.g., a hand-written signature) that can be "cut-and-pasted" by R from one document to another.

3. Signatures are recipient-specific, namely, if the same message is intended for two different recipients then the signer needs to sign it twice, once for each recipient (since the chameleon hash functions are specific and different for each recipient).

In other words the signatures are at the same time non-repudiable (property 1) and non-transferable (property 2). Non-transferability means, that only the intended recipient can be convinced of the validity of a signature, while no third party can be convinced of that validity (even with the help of the recipient) or to get any other information on the contents of the signed message. This is the core property that protects our signatures from the danger of uncontrolled dissemination. However, how can the non-repudiation property be implemented if no third party can determine the validity or invalidity of a signature?

The point is that, following the same principle of undeniable signatures, a signature as above can be validated or denied in collaboration with the signer. In case of a legal dispute between R and S, the latter can be summoned to appear before a judge who can request that S accept the signature as claimed by R or otherwise deny it. For denying a signature we show a very simple procedure which draws on the property that if R presents an invalid signature then S can show collisions in the chameleon hash function $H_R$. This will be sufficient proof of R's cheating (as the function is otherwise collision resistant for S). On the other hand if R is honest there is no way for S to deny the signature. Furthermore, even if a judge (or other party) who got the validation (denial) of the signature from the signer, provides a third party (e.g., a journalist or competitor) with all the information he got from S, there is still no way for that third party to validate (deny) the signature.

We call the signatures obtained by following the above approach chameleon signatures (again the pictorial name refers to the ability of the recipient to "open" the signature contents in any desired way). There are some more technical details to take care of (and we do that in the next sections) but the above descriptions represents quite accurately this new notion.

The combination of regular digital signature schemes and chameleon hashing results in simple and efficient constructions of chameleon signatures. The total cost of such schemes is about twice the cost of regular digital signatures (e.g. RSA or DSS). The security of our chameleon signatures is proven based on standard cryptographic assumptions. In particular, we prove the unforgeability property solely based on the unforgeability of the underlying digital signature in use. The non-repudiation property is based on the same assumptions needed to build chameleon hash functions, e.g., the hardness of factoring or computing discrete logarithms. The non-transferability property depends also on the underlying chameleon hash function. Remarkably, we can show constructions of chameleon signatures where non-transferability is achieved unconditionally, namely, the signed message is information theoretically hidden by the signature string.

1.3 Related Work

As said before chameleon signatures are motivated by the same basic concerns as undeniable signatures. For many applications, chameleon signatures are a cheaper alternative to undeniable signatures. The practical advantages of chameleon signatures are their simplicity (especially, since they follow the traditional format of a regular signatures applied to a hash function), the lack of interaction for verification or denial, a better computational performance, and several analytical advantages (especially the sufficiency of more standard cryptographic assumptions). Notably, the whole inherent complexity of undeniable signatures due to the use of interactive zero-knowledge proofs is avoided her at once[3]. On the other hand, the recipient-specific nature of chameleon signatures make them unsuited for applications where the same signature string is to be verified by different recipients, or when the identities of signer and recipient need to be kept secret (see Section 9 for methods to hide these identities). Still, chameleon signatures cover much of the applications that motivate undeniable signatures, most notably, protecting the confidentiality of agreements as described and exemplified in the beginning of this introduction.

[3]Undeniable signatures with non-interactive verification have been recently presented in [JSI96] and also in [Cha]. Their solution still uses zero-knowledge proofs and in addition assumes an ideal hash function in order to get rid of the interactivity. The scheme is based on a particular discrete log-related construction of undeniable signatures. Interestingly, they also use trapdoor commitments but applied to the confirmation proof rather than to the signature generation as in our case. A non-interactive denial protocol is suggested in [JSI96] but its details and practicality are unclear.

For readers familiar with the work on Fail-Stop Signatures [PP97], it is interesting to point out to a similarity between our techniques and the way fail-stop signatures are constructed. The latter have the property that the signer can prove forgeries that are due to cryptanalysis (as opposed to forgeries due to the stealing of the signer's secret signature key). Technically, this is done by using a special type of hashing for which the signer can find collisions if and only if he is presented with a cryptanalytical forgery. Thus, even if the goals and constructions of fail-stop and chameleon signatures are very different, the approach of proving forgeries by collisions is similar in both cases.

1.4 Convertibility

In the undeniable signature literature, a property that has received a lot of attention is convertibility. This notion (introduced in [BCDP90]) represents the ability of the signer to eventually release a piece of secret information that converts the signature into a regular digital signature with the traditional property that anyone can verify it without the help of the signer. This can be a useful property for signatures that loose their non-transferability requirement after some time period, or after some event. Our schemes for chameleon signatures provide for simple ways to achieve convertibility. We present selective and total conversion techniques. The first means that individual (selected) signatures can be converted by providing some information specific to that signature. Total conversion means that the signer releases some (short) piece of information that converts all the signatures in a pre-specified set into regular signatures.

2 Chameleon Hashing

A chameleon hash function is associated with a user R who has published a public (hashing) key, denoted $HK_R$, and holds the corresponding secret key (the trapdoor for finding collisions), denoted $CK_R$. The pair of public and secret keys is generated by R according to a given generation algorithm. The public key $HK_R$ defines a chameleon hash function, denoted CHAM-HASH$_R$(.,.), which can be computed efficiently given the value of $HK_R$. On input a message m and a random string r, this function generates a hash value CHAM-HASH$_R$(m, r) which satisfies the following properties:

Collision resistance There is no efficient algorithm that on input the public key $HK_R$ can find pairs $m_1, r_1$, and $m_2, r_2$ where $m_1 \neq m_2$ such that CHAM-HASH$_R(m_1, r_1)$= CHAM-HASH$_R(m_2, r_2)$, except with negligible probability.

Trapdoor collisions There is an efficient algorithm that on input the secret key $CK_R$, any pair $m_1, r_1$, and any additional message $m_2$, finds a value $r_2$ such that CHAM-HASH$_R(m_1, r_1)$=CHAM-HASH$_R(m_2, r_2)$.

Uniformity All messages m induce the same probability distribution on CHAM-HASH$_R$(m, r) for r chosen uniformly at random. (In particular, from seeing CHAM-HASH$_R$(m, r) for randomly chosen r nothing is learned about the message m). This condition can be relaxed to require that the above distributions are not necessarily identical for all messages but computationally indistinguishable [GM84].

In the above definition we do not specify the exact notions of efficiency and of negligible probability. These can be modeled by polynomial bounds or be quantified by explicit (concrete) time and probability bounds. We note that the probability in finding collisions (in the first condition) depends on the internal random bits of the collision-finder algorithm as well as on the random choices of the algorithm that generates the pair of private and public keys for the hash (e.g., there may be such pairs where finding collisions is easy but the generation algorithm will output them with only negligible probability).

Chameleon hash functions are intended to act on arbitrarily long messages and generate an output of fixed (or bounded) length. An important property of chameleon hashing is presented in the next Lemma, and is easy to verify.

Lemma 1 The composition of a chameleon hash function and a (regular) collision-resistant hash function (where the latter is applied first) results in a chameleon hash function.

Thus, if we have a collision-resistant hash function that maps arbitrary messages to hash values of length $\rho$, e.g. $\rho=160$ for SHA-1 [fST95], then it is enough to design a chameleon hash function that hashes elements of length $\rho$. We use this fact in our implementations below as well as in the applications of these functions to chameleon signatures. In some cases, even if the chameleon hash function that we construct directly supports arbitrary length messages, it will be more efficient to first apply a (faster) regular collision-resistant function to the message and then the chameleon hash.

Being a central tool in the construction of chameleon signatures it is important to show efficient constructions of chameleon hashing based on standard cryptographic assumptions. In what follows we present several constructions of chameleon hash functions; in particular, an efficient construction based on the hardness of factoring, and another based on the hardness of discrete log.

Remark. Chameleon hashing is rooted in the notion of chameleon commitment (also called chameleon blobs or trapdoor commitments) which were first introduced by Brassard, Chaum and Crepeau [BCC88] in the context of zero-knowledge proofs. Any chameleon commitment scheme with a non-interactive commitment phase induces a chameleon hash function, and vice versa. To see this notice that the collision-resistant property of chameleon hashing implies that the function CHAM-HASH$_R$(m, r) would bind a committer to a certain value m as he cannot open the commitment in two different ways. The trapdoor property gives the "chameleon" property as it enables R (the recipient of the commitment in this case) to open the hash string hash to any possible pre-image value m'. The uniformity property prevents a third party, examining the value hash, from deducing any information about the hashed message. A basic difference, however, between commitment schemes and chameleon hashing is that the former refer to interactive protocols (with a commitment and an opening phase) while the latter refer to a function applied to some information in order to produce a hash value.

2.1 Chameleon Hashing Based on Claw-free Trapdoor Permutations

We present a general construction of chameleon hashing based on claw-free trapdoor permutations, and a specific efficient implementation based on the hardness of factoring. This construction was first introduced by Goldwasser, Micali and Rivest [GMR88] for building regular digital signatures, and used by Damgard [Dam87] to build collision resistant hash functions. We use the trapdoor information of these permutations to provide the trapdoor collision finding property of chameleon hashing.

2.1.1 General Construction

Informally, a pair of permutations (f0(x), f1(x)) over a common domain is called "claw-free" if it is computationally infeasible to find values x and y from the domain such that f0(x)=f1(y). Below we present a construction of chameleon hashing based on such a pair provided that each permutation in the pair has an inverting trapdoor. We assume the message space on which the hash function is applied to be suffix-free (i.e. no message is represented as the suffix of another message). Such a message representation can be achieved by appending the length of the message to its end, or by using messages of the same length. The latter is the natural case when applying a chameleon hash function to the output of a collision-resistant hash function such as SHA (see Lemma 1). We denote the binary representation of a message m of length k as m=m[1]...m[k] where m[1] is the first message bit and m[k] the last.

Setup: A pair of claw-free trapdoor permutations (f0, f0$^{-1}$, f1, f1$^{-1}$). The private key is (f0$^{-1}$, f1$^{-1}$) and the public key is (f0, f1).

The function: Given a message m=m[1]...m[k] we define the hash as CHAM-HASH$_{(f0,f1)}$(m, r)=f$_{m[k]}$(... (f$_{m[2]}$(f$_{m[1]}$(r))...))

Lemma 2 The construction above is a chameleon hash scheme provided that (f0, f1) is a pair of claw-free trapdoor permutations and the message space is suffix-free.

Proof We proceed to prove that the scheme satisfies the properties defined in Section 2.

Collision resistance Assume that given (f0, f1) (but not the trapdoors) one can find two pairs $m_1, r_1$ and $m_2, r_2$ with $m_1 \ne m_2$ such that CHAM-HASH$_{(f0,f1)}$($m_1, r_1$)=CHAM-HASH$_{(f0,f1)}$($m_2, r_2$). Let i be the largest index of a bit where $m_1$ and $m_2$ differ (i.e., $m_1[i] \ne m_2[i]$ and $m_1[j]=m_2[j]$ for all j>i). Such a bit exists due to the suffix-free property. Since we assume that the result of the hash function on ($m_1, r_1$) and ($m_2, r_2$) is the same, and the messages are identical in positions i+1, ..., k then the result of the computation after the i-th bit must also be the same for both messages (we use the fact that both f0 and f1 are permutations). Thus we found a pair of values $r'_1$ and $r'_2$ for which $f_{m1[s]}(r'_1)=f_{m2[s]}(r'_2)$ but $m_1[i] \ne m_2[i]$ in contradiction to the fact that f0, f1 is a claw free pair.

Trapdoor collisions Given any pair ($m_1, r_1$), an additional message $m_2$ and the knowledge of the trapdoor, the value $r_2$ can be computed as follows:

$$r_2 = f_{m2[k']}^{-1}(f_{m2[k'-1]}^{-1}(\ldots (f_{m2[1]}^{-1}(\text{CHAM-HASH}(m_1, r_1)))\ldots)).$$

Uniformity As the function f0, f1 are permutations so is their composition. Thus, given a message m then for every value hash there exists exactly one value r such that CHAM-HASH$_{(f0,f1)}$(m, r)=hash.

2.1.2 Efficient Implementation Based on the Intractability of Factoring

Below we present a specific implementation of chameleon hashing, based solely on the hardness of factoring. It is based on the following pair of claw-free trapdoor permutations.

Choose primes p≡3 mod 8 and q≡7 mod 8 and compute n=pq.

Define f0(x)=x$^2$ mod n f1(x)=4x$^2$ mod n

The domain of these functions should be taken as D={x ∈ $Z_n^*$ | (x/p)=(x/q)=1}.

The proof that the above construction is a claw-free permutation under the assumption that factoring is hard appears in Appendix A. The proof is a simple variation of the proof in [GMR88].

Note that when computing the inverses of these functions there is need to choose the square root which is itself a quadratic residue.

Input: Message $m = m[1]\ldots m[k]$
$HK_R = n$ as defined above
Choose random value $r \in Z_n^*$;
hash := $r^2$ mod $n$
for $i = 1$ to $k$
    hash := $4^{m[i]}$hash$^2$ mod $n$ Computation analysis. The number of operations required to compute this chameleon hash is |m| squarings and up to |m| multiplications (by 4) mod n. Typically, for our application, m is a hashed message and then the expected number of multiplications will be |m|/2, and |m| itself about 160 bit-long only. Thus the total cost is significantly lower than a full long exponentiation mod n and, in particular, than an RSA signature. Note, that the above function (if we take m[1] to be the most significant bit of m and m[k] the least significant) computes to CHAM-HASH(m, r$^2$)=4$^m$(r$^2$)$^{2[m]}$.

2.2 Chameleon Hashing Based on Discrete Log

This solution for chameleon hashing is based on a well known chameleon commitment scheme due to Boyar et al. [BKK90] (see also [BCC88]).

Setup: Prime numbers p and q such that p=kq+1, where q is a large enough prime factor An element g of order q in $Z_p^*$ The private key $CK_R$ is x ∈ $Z_q^*$ The public key $HK_R$ is y=g$^x$ mod p (p, q, g are implicit parts of the public key)

The function: Given a message m ∈ $Z_q^*$ choose a random value r ∈ $Z_q^*$ define the hash as CHAM-HASH$_y$(m, r)=g$^m$y$^r$ mod p The collision resistance property of the scheme above (for anyone that does not know x) is based on the hardness of computing discrete logarithms. The knowledge of x, the trapdoor information, enables computing trapdoor collisions, namely, for any given m, m' and r all in $Z_q^*$ a value r' ∈ $Z_q^*$ can be found such that CHAM-HASH$_y$(m, r)=CHAM-HASH$_y$(m', r'). This is done by solving for r' in the equation m+xr=m'+xr' mod q. From this we can also see that the uniformity property of CHAM-HASH also holds.

3 The Basics of Chameleon Signature Schemes

Here we present in some detail the basic components and requirements of a chameleon signature scheme. As we have stated previously a chameleon signature is generated by digitally signing a chameleon hash value of the message. In Section 3.1 we introduce the basic functions associated with a chameleon signature scheme. Then in Section 3.2 we discuss the limitations of the basic scheme and motivate the more involved details of our complete solutions which are presented in Sections 4 and 6.

3.1 The basic components

We start by describing the setting for Chameleon Signatures. The setting defines the players and the agreed upon functions and keys.

Players: Signer S and recipient R. In addition, we shall refer to a judge J who represents a party in charge of settling disputes between S and R, and with whom S is assumed to collaborate.

Functions: the players agree on:
A digital signature scheme (e.g., RSA, DSS) which defines a set of public and private keys associated with the signer, and the usual operations of signing, denoted by SIGN, and vertification, denoted by VERIFY. That is, SIGN takes as input a message m and returns the signature on the message under the signer's private key, and VERIFY takes a message and its signature and uses the signer's public key to decide on the validity (or invalidity) of the signature. We assume this signature scheme to be unforgeable [GMR88]. (In practice, this usually requires an appropriate encoding of the signed information, e.g. using a cryptographic hash function.)

A chameleon bashing function which defines a set of public and private keys associated with the "owner" of the hash, and the operation CHAM-HASH for generating a hash on a message In our setting the "owner" of the hash functions will be the recipient.

Keys:
The signer S has a public and private signature keys which correspond to the agreed upon signature scheme, denoted by $VK_S$ and $SK_S$, respectively.

The recipient R has a public and private keys as required by the agreed upon chameleon hashing scheme. These are denoted by $HK_R$ and $CK_R$, respectively.

We can assume that all public keys are registered with some trusted certification authority (depending on the legal requirements of a given application). It must be noted that when a person registers the public data required for the chameleon hash he must prove that he known the trapdoor information (i.e., the corresponding private key) for the hard[4].

[4]Proving knowledge of the secrete key by the registrant R is required to avoid the case in which the private key is chosen by or known only to a third party P. In such as case, P will get convinced of signature signed for R since only he knows the trapdoor information and not R.

We not present the three basic stages of a chameleon signatures scheme and their basic implementation (more complete details are given in subsequent sections):

3.1.1 Chameleon Signing

Given a message m, and keys $SK_S$, and $HK_R$, the signer generates a signature for m in the following manner: The signer chooses a random element r and computes hash m $CHAM-HASH_R(m, r)$ and $sig=SIGN_S(hash)$. The triple $SIG(m)=(m, r, sig)$ is then transmitted from S to R. Note: We stress that it is important in order to guarantee non-transferability (see Section 3.3) that the values m and r transmitted from S to R are not part of the information signed under the function SIGN. The channel between S and R can still be authenticated as long as that authentication is repudiable—e.g. using a symmetric key MAC scheme.

3.2.1 Chameleon Verification

Given as input the triple (m, r, sig), and the public keys of both signer ($VK_S$) and recipient ($HK_R$) a chameleon verification is performed as follows. The value hash is computed as $CHAM-HASH_R (m,r)$ and the string sig is verified using the VERIFY function of the standard signature scheme under $VK_S$ (i.e., whether sig is the valid signature of S on hash). The chameleon verification denoted by CHAM-VER outputs that the signature is a proper (resp., improper) chameleon signature when the signature verification outputs valid (resp., invalid).

Note: This verification function is sufficient for R to get assurance of the validity of S's signature (i.e., R is assured that S will not be able to later deny the signature). However, for any other party, a successful verification represents no proof that S signed a particular message since R (knowing $CK_R$) could have produced it by himself.

Terminology: We will use the notation $CHAM-VER_{R,S}(m,r,sig)$ to denote that the chameleon verification is applied to the triple (m,r,sig) using the public keys of R and S. If the output of this function is "proper" we call (m, r, sig) an (R,S)-proper triple. (We omit the pair (R,S) when these values are clear from the context.)

S.I.S. Dispute

In case of a dispute on the validity of a signature, R can turn to an authorized judge J. The judge gets from R a triple $SIG(\hat{m},\hat{r},\hat{sig})$ on which J applies the above CHAM-VER function. This first test, by the judge, is to verify that the triple is an (R,S)-proper signature on the message $\hat{m}$. If this verification fails then the alleged signature is rejected by J. Otherwise, J summons the signer to deny/accept the claim. In this case we assume the signer to cooperate with the judge (say, by force of law). J sends to S the triple $SIG(\hat{m})$. If the signer wants to accept the signature he simply confirms to the judge this fact. On the other hand, if S wants to claim that the signature is invalid he will need to provide a collision in the hash function, i.e. a value $m^1 \neq \hat{m}$, and a value $r^1$ such that $CHAM-HASH_R(m',r')=CHAM-HASH_R(\hat{m}, \bar{r})$. Notice that S can always present such a pair m',r' if the signature $SIG(\hat{m})$ is invalid (since in this case $\hat{sig}$ was originally generated by S with some pair m,r different than $\hat{m}$, $\hat{r}$). In other words, by claiming a false signature, the recipient R provides S with a collision in the function $CHAM-HASH_R$. Yet, if the signature $SIG(\hat{m})$ is valid then S cannot find collisons and the signature cannot be repudiated. Hence, the validity of $SIG(\hat{m})$ is rejected by J if S can present collisions to the hash function, and accepted otherwise.

3.2 Enhancements to the Basic Scheme

The above scheme conveys the main idea of our construction but suffers from several limitations which we need to solve in order to obtain a complete and practical chameleon signature scheme.

The recipient's identity. In the above scheme the identity of R (or his public key) is not bound to the value of hash. In this case the signer S can deny a signature by claiming that the signature was issued by him for another party A and on a different document. This is possible is S known A's hashing trapdoor information since in such a case S can open the signature to represent any message signed for A. Notice that it is isn't enough to include the name of the recipient R within the document being signed, as this can be changed by S to any value (e.g., to the identity of A) using A's trapdoor. Thus, we need to bind the identity of the recipient to the hashed value by signing (with S's signature) both hash and the identify of R which we denote by $id_R$. This is the reason why the identity of R is not concealed in our schemes. (In a practical implementation the identity of R may include information on the specific public key of R as well as information on the specific chameleon hashing scheme, certification authority, etc.). For applications in which the disclosure of R's identity is to be avoided we present a mechanism to alleviate this problem in Section 9.

Exposure-freeness. Notice that if a judge J summons a signer S to deny a forgery SIG(m̂)=(m̂,r̂,ŝîĝ) then it must be that ŝîĝ has been generated by S as the signature on some message m using a string r for which CHAM-HASH$_R$(m, r)=CHAM-HASH$_R$(m̂,r̂). (We are guaranteed of that since J first verifies SIG(m̂) under the chameleon verification procedure.) If R's claim is false, S can always show a collision in the hash function by exposing the real m and r originally used for that signature. However by doing so S is disclosing information that he may be interested to conceal (i.e., the existence of the signature on m). This may be undesirable in certain applications. We will require that the signer will be able to deny a forgery without exposing the real contents of any message which he signed, and will make this a property of all our chameleon signature schemes. (The solutions we present achieve this goal in a strong sense, namely, S can deny the signature by presenting a random message m' totally unrelated to the original value m or to any other message signed by S.) We shall refer to this property as exposure free.

Memory requirements. As observed above, the signer needs to participate in a denial of a signature only if the ŝîĝ component of an alleged signature SIG(m̂) corresponds to a signature generated by him (for R) for some message m. If this signature is in fact a forgery, in order to deny it in our schemes, the signer will need to find out what was the real message corresponding to ŝîĝ. One solution is that the signer will store all his signatures together with the corresponding signed message, as there is no means of computation by which he can extract the original message out of the hash. While this may be practical in some applications it may be prohibitive in others. We show how to relax this need by transferring the storage of this information to the recipient. Note that this is a reasonable requirement as R must always store the signatures and corresponding messages. This is done in the following manner, the signer will have some private key, k, under which he encrypts both m and r generating enc$_k$(m,r). This value is signed together with hash and the identity of R. (We note that if suffices to encrypt a hash value of m under a collision-resistant hash function rather than the entire message m. In this case S signs by applying CHAM-HASH to this hash value of m rather than to m itself.) the encryption must be semantically secure [GM84] and can be implemented using a symmetric or asymmetric cryptosystem. Note, that if this option is used then the non-transferability property discussed below cannot be achieved information-theoretically.

3.3 Security Requirements

Here we summarize the security properties that we require from a chameleon signature scheme. Formal definitions will be presented in the final version of this paper.

We shall say that a signature scheme carried out by a signer S, a recipient R and a judge J, which is composed of the functions described in Section 3 is a secure chameleon signature scheme if the following properties are satisfied. (In what follows we refer as a third party to any party different than the signer and recipient.)

Unforgeability. No third party can produce an (R,S)-proper triple SIG(m)=(m,r,sig) not previously generated by the signer S. The intended recipient R can produce an (R,S)-proper triple (m,r,sig) only for values sig previously generated by S.

Non-transferability. Except for the signer himself, no one can provide to another party that the signer produced a given triple SIG(m)=(m,r,sig) for any such triple. This should be true for the recipient and for any third party (including one—say a judge—that participated in a denial/confirmation protocol with the signer).

Denial. In case of dispute, if the signer S is presented with a triple SIG(m)=(m,r,sig) not produced by him, then S can convince a (honest) judge J to reject SIG(m).

Non-repudiation. In case of dispute, if the signer S is presented with a triple SIG(m)=(m,r,sig) produced by him, then S cannot convince a (honest) judge J to reject SIG(m).

Exposure free. A chameleon signature scheme is exposure free if the signer can deny a false signature (i.e., a triple (m,r,sig) not produced by him) without exposing any other message actually signed by him.

4 A Full Chameleon Signature Scheme

In this section we shall describe, for concreteness, a specific system for Chameleon Signatures which fully satisfies the above functionality and security requirements. The implementation described below achieve the property of being exposure-free, i.e. in case of denial the signer will be able to prove the invalidity of the signature without exposing any of his signed messages. We omit details of memory management, namely, whether the message m and its signature are kept by the signer for possible disputes or whether an encryption of the hashed message is added to the signature. The techniques for solving these issues as described in Section 3.2 are independent of the type of chameleon hash used and can be easily added here.

The Chameleon Hashing which will be employed is the factoring claw-free based chameleon hashing described in Section 2.1 (For another example based on discrete log see Appendix B). In addition to the CHAM-HASH function we will use the functions SIGN and VERIFY as defined by some specific signature scheme (e.g., RSA with the appropriate encoding of the signature arguments as discussed in Section 3.1), ad for which S generates a pair of provide and public keys.

Based on the above we can define the function CHAM-SIG for chameleon signature generation, and the function CHAM-VER for chameleon verification, these are described below. The construction follows the basic scheme of Section 3.1 with the addition of id$_R$ under the signature. We remark that the message m used as input to the signature can be first hashed using a collision-resistant has function (e.g., SHA) and the result of this hashing used as the input to the chameleon hash function (see Lemma 1).[5]

[5]Typically, this will result in several layers of hashing. First a collision-resistant hashing of the message is computed; then, the chameleon hashing is applied to this value; finally, the resultant chameleon hash value and other items to be signed are input to some standard encoding procedure (usually based on hash functions too) for the specific digital signature scheme in use.

As was described in Section 3.1 in case of dispute the signer will be presented with a triple SIG(m')=(m',r',sig) which passes the CHAM-VER verification, i.e. sig is a possible signature generated by the signer for the message m'. The signature will be considered in valid if the signet can provide a collision in the hash function. Furthermore, disavowing the signature should be achieved without exposing the original message which the signer signed. In Section 6 we shall describe a generic method for achieving this goal, but here we will enable exposure freeness by taking advantage of the underlying properties of the claw-free permutation chameleon hashing scheme. In this particular solution, once the recipient has presented a forgery (which passes the chameleon verification) then not only will the signer be able to disavow the specific signature but he will also be able to exposure R's private key ($f_0^{-1}, f_1^{-1}$). Knowledge of ($f_0^{-1}, f_1^{-1}$) in turn enables the signer to disavow all other messages which he signed using this chameleon hashing, due to the fact that knowledge of the trapdoor enables finding collisions.

Chameleon Signature Generation—CHAM-SIG

Input of Signer: Message m private signing key of S, $SK_S$ $id_R$ and public key of R, $HK_r=(f_0,f_1)$
1. Generate the chameleon hash of m by choosing a random $r^2 \epsilon Z^*_n$ and computing hash=CHAM-$HASH_R(m,r^2)=f_{m(1)}(f_{m[2]}(\ldots(f_{m[k]}(r^2))\ldots))$ (FIG. 2)
2. Set $sig=SIGN_S(hash,id_R)$
3. The signature on the message m consists of SIG(m)= (m,r,sig).

Chameleon Signature Verification—CHAM-VER

Input: SIG(m)=(m,r,sig) public verification key of S, $VK_S$ $id_R$ and public key of R, $HK_R=(f_0, f_1)$
1. Computer hash=$CHAM-HASH_R(m,r^2)=f_{m[1]}(f_{m[2]}(\ldots f_{m[k]}(r^2))\ldots))$
2. output=

$$output = \begin{cases} proper & VERIFY_S((hash, id_R), sig) = valid \\ improper & otherwise \end{cases}$$

collisions. The extraction of the secret key is achieved in the following manner: in order to cheat R has to present a value sig which was actually signed by the signer, but to give a false message. Thus he is providing a collision in the hash function, and in this specific construction this means that he is providing a claw. As has been shown by [GMR88] such a claw enables to factor the modulus n. Once the factorization is computed the signer can invert both $f_0$ and $f_1$. The protocol carried out by the signer for extracting the secret key and producing an unrelated collision in the hash is described below.

Note that in the dispute protocol when a signer decides to accept a signature SIG(m') then no "proof" is provided to J of this validity (S only declares acceptance). As a consequence, it could be the case that the signature is not valid but S decides to accept it now and maybe to deny it at a later time. In applications where this situation is considered a real concern it can be overcome by running the denial procedure in two stages; first, J sends to S the alleged message m' and signature sign. If S accepts the signature as valid then it needs to send to J a value r that must be equal to r'. If he claims the signature to be invalid then the denial procedure is completed as specified above (that is, J sends r' to S and S responds with a collision).

Theorem 1 Assuming a secure digital signature scheme and the hardness of factoring, the above procedures form a chameleon signature scheme satisfying the properties of non-transferability, unforgeability non-repudiation, denial, and exposure freeness.

Generate Collision

Input: a forgery SIG(m')=(M',r',sig)
1. S retrieves[a] the original values m, $r^2$ used to compute sign. It holds that $f_{m[1]}(f_{m[2]}(\ldots(f_{m[k]}(r^2))\ldots))=f_{m'[1]}(f_{m'[2]}(\ldots(f_{m'[k]}(r'^2))\ldots))$, while m≠m'.

[a]The retrieval of m and $r^2$ can be done out of S's archives or using the encryption technique described in Section 3.2.

2. Find an index i such that m[i]≠m'[i] and for all values j<i m[i]=m'[i]. Thus, $f_{m[i]}(r_1)=f_{m'[i]}(r_2)$ for some values $r_1,r_2$.
3. Compute $r_1=f_{m[i-1]}(f_{m[i-2]}(\ldots f_{m[k]}(r^2))\ldots))$ and $r_2=f_{m'[i-31]}(f_{m'[i-2]}(\ldots f_{m'[k]}(r'^2))\ldots))$.

4. S computes $p=gcd(r_1 \pm 2r_2, n)$ and $q=n/p$. This in return defines ($f_0^{-1}, f_1^{-1}$).
5. S chooses any message $\hat{m}$ and computes $\overline{m}$ and computers $\bar{r}=f_{\overline{m}}[1]^{-1}(f_{\overline{m}}[2]^{-1}(\ldots .(f_{\overline{m}}[k]^{-1}(CHAM-HASH(m,r)))\ldots))$ choosing the value which is in the domain of the function.
6. Output $(\overline{m},\bar{r})$.

Proof.

Non-transferability. Given a signature SIG=(m,r,sig) generated by the signer S for a recipient R, the recipient cannot convince a third party of its validity. This is due to the fact that for every possible message m', R can compute a value r' such that $CHAM-HASH_R(m,r)=CHAM-HASH_R(m',r')$ (see Section 2.1). Thus, (m', r',sig) is an (R,S)-proper signature. Furthermore, since for every possible message m' there exists exactly one value r' that produces a proper triple (m',r', sig) then nothing is learned about the value of m from seeing the signature string sig. Thus non-transferability is achieved unconditionally, i.e. in the information theoretic sense. In addition, no third party can prove validity of the signature as it may be assumed that he is in collusion with the recipient.

Unforgeability. No third party can generate an (R,S)-proper triple SIG(m)=(m,r,sig) which has not been previously generated by the signer S, as this requires either to break the underlying digital signature scheme, or to find collision in the chameleon hash function which, in turn, implies computing the secret trapdoor information of R. The recipient cannot generate an (R,S)-proper triple SIG(m)=(m,r,sig) with a component sig which has not been previously signed by the signer as this requires to break the underlying digital signature scheme.

Non-repudiation. Given an (R,S)-proper triple SIG(m)= (m,r,sig) generated by the signer, the signer cannot generate another (R,S)-proper triple SIG(m')=(m',r',sig) for m≠m' as this would be equivalent to computing the secrete trapdoor information (i.e. computing the prime factors of n), which we assume to be infeasible by the hardness of factoring.

Exposure freeness. Since we assume the underlying digital signature to be unforgeable, the signer S may be required to deny a signature only for a triple SIG(m')= (m',r',sig) which is (R,S)-proper but not originally generated by S. In this case, S must posses another proper triple SIG(m)=(m,r,sig) that he really signed. Using these values S extracts the secret trapdoor information as described in FIG. 5. Given this trapdoor the signer can deny the signature by presenting a collision using any message of this choice.

5 Exposure Freeness Using any Chameleon Hash Function

In Section 3 we showed a generic chameleon signature scheme based on any chameleon hash. However, that generic scheme does not guarantee exposure-freeness. This was achieved in Section 4 using a particular chameleon hash function. It remains to be shown how to guarantee the exposure freeness property (where no information on any signed message is leaked during a dispute) without recurring to particular properties of the underlying hash function. (In particular without assuming that the knowledge of a single collision of two points in the hash provides a way to find other such pairs.) We will assume a generic chameleon hash function CHAM-HASH.

Given a message m which the signer wants to sign, he chooses two random messages $m_1$ and $m_2$ such that $m \ominus m_1 = m_2$. He now will generate a chameleon signature for m by hashing and signing both $m_1$ and $m_2$. Namely, we will have $SIG(m)=(m_1m_2r_1, r_2, SIGN_S(CHAM\text{-}HASH_R(m_1,r_1), CHAM\text{-}HASH_R(m_{2l},r_2),id_R))$.

In order to present an alleged signature the recipient must now give two pairs $(m_1', r_1')$ and $(m_2',r_2')$ for each one of the hashed components. If he is presenting a forgery then at least one of $m_1'$ and $m_2'$ must be different than $m_1$ and $m_2$, respectively. Let's assume $m_1 \neq m_1'$. Now, the signer can simply expose the values $m_1,r_1$. This reveals no information about the actual message m which was signed. It is important that the signer exposure only one of the original pairs because exposing both of them would enable reconstruction o the original message. Thus, for future disputes on $SIG(m)$ the signer, assuming that he has exposed $m_1$, must now store $m_1', r_1'$. The next time there is a dispute concerning the same signature, if the recipient gives the original $m_1$ and a changed value for the second component, the signer can still exhibit a collision in the first component by giving out $m_1'$, $r_1'$.

Generating the above method to stand k disputes on the same signature before there is a need to store any information is straightforward, just use k+1 components of m, i.e., $m=m_1\ominus m_2\ominus \ldots \ominus m_{k+1}$.

Theorem 2 Given any chameleon hash function and a secure digital signature scheme, a chameleon signature scheme can be built to satisfy the properties of non-transferability, unforgeability, non-repudiation, denial, and exposure freeness.

Proof. Combine the techniques of Section 3 with the above method for exposure freeness.

6 Convertibility

The notion of convertibility of undeniable signatures was introduced by Boyar, Chaum, Damgard and Pedersen [BCDP90]. The idea is that an undeniable signature will be transformed into a regular publicly verifiable (non-repudiable) signature by publishing some information. There are also variations to the notion of convertibility, i.e. complete and selective. Complete convertibility transforms all the signatures generated under the same key, while selective convertibility transforms only a single signature. Secure solutions to the problem of convertible undeniable signatures appear in Damgard and Pederson [DP96] and Gennaro, Krawczyk, and Rabin [GKR97].

In Section 3.2 we introduced a method in order to circumvent the need for the signer to store the message. Using this same technique we can enable convertibility. The mechanism was that the signer includes under his signature an encryption of the signed message[6]. To enable convertibility the signer needs to encrypt the message using a public key encryption. Furthermore, the signer will commit to the encryption public key that he is using by signing this public key together with the encryption of the message (this prevents problems similar to those pointed out in [AN95] when signing an encryption). Thus, the signer is committed to some encryption string. However, the contents of the encrypted string cannot be learned by any third party due to the semantic security of the encryption. Now, we can achieve selective convertibility by having the signer expose the random bits used for the specific probabilistic encryption of the signed message, and complete convertibility by exposing the decryption key. (This commitment is unique given the one-to-one nature of the encryption function.)

7 Chameleon Signatures and Undeniable Certificates

In [GKR96] the notion of of undeniable certificates was introduced. Here we show how to combine together an undeniable certificate scheme and chameleon signatures.

In undeniable certificates there is some initial interaction between the signer P and the verifier V, after which many undeniable signatures can be provided from P to V and be verified by the latter without the need for further interaction. This is achieved by having P provide V, during the initial interaction, with a "certificate" for a signature public key that is chosen by P. (This public key is for a regular digital signature scheme.) The certificate for the public key is signed by P using an undeniable signature scheme. The verifier can verify the corrections of the signature by interacting P. Later, P can use the certified public key to sign (using regular digital signatures) further message intended for V.

We note that in this method, once the signer confirms his certificate to a third party he is also confirming all the signatures signed under that certificate. Such a scheme may be acceptable in many applications (e.g., where a given certificate is used to sign a set of documents that need to be protected/revealed as a whole). However, in some cases one would like to be able to confirm a single signature without exposing all other signatures signed under the same certificate. In the following we see that this can be circumvented by combining undeniable certificates with chameleon signatures. At first a certificate is issued for the signer's public key at described before, but now all subsequent signatures are generated under this key using a chameleon signature scheme. Thus, we achieve that once the certificate is exposed the signatures are still chameleon signatures and hence their contents is not exposed.

Furthermore, by using the undeniable certificate on top of the chameleon signatures the identify of the signer and recipient are kept secret, as long as the certificate has not been verified.

A Proof of Construction of Claw-free Permutation

Recall the construction from Section 2.1.2: Choose primes $p \equiv 3 \mod 8$ and $q \equiv 7 \mod 8$ and compute $n=pq$. Define $f_0(z)=x^2 \mod n$
$f_1(z)=4x^2 \mod n$ The domain of these function should be taken as $$D = \left\{ x \in Z_n^* \,\bigg|\, \left(\frac{x}{p}\right) = \left(\frac{x}{q}\right) = 1 \right\}.$$

Note, that under this selection of p, q the following properties hold:

1. $-1$ is not a quadratic residue mod n,p,q
2.

$$\left(\frac{2}{p}\right) = -1$$

3.

$$\left(\frac{2}{q}\right) = 1$$

The following proof is a variation of the proof which appears in [GMR88] in order to deal with the different choice of the domain.

Lemma 3 The functions $f_0(x)$ and $f_1(x)$ are permutations.

Proof Assume that there exist z, y such that $z \neq y$ and $f_0(x)=f_0(y)$, thus $x^{2l-y}{}_2 \equiv 0$ and n. The primes p,q cannot divide x+y because that would mean that $x \equiv -y \mod p$ and the same for q which is impossible. Thus, it must be that p and q divide z−y which means that z=y-contradiction.

The fact that $f_1(x)$ is a permutation is derived directly from the fact that $f_0(z)$ is a permutation and $f_1(x)$ is just a multiplication by 4 which preserve the permutation.

Lemma 4 $f_o$, $f_1$ are a claw free pair.

Proof Assume that you can find z, y such that $f_0(z)=f_1(y)$ thus we have that $z^2-4y^2 \equiv 0$ mod n. We will show that $z \neq \pm 2y$ mod n and hence by computing the $gcd(z\pm 2y,n)$ a (non-trivial) factor of n can be computed.

$z \neq 2y$ and n because $z \neq 2y$ mod p as 2 is a n.q.r and p (property 2) and both z and y are q.r. modp.

$z \neq -2y$ mod n because $z \neq -2y$ mod q as $-2$ is a n.q.r modq (property 3 and 1) and both z and y are q.r. modq.

B Discrete Log Based Chameleon Signatures

In this section we give a chameleon signature scheme where the underlying chameleon hashing is the one described in Section 2.2. This construction appears below.

Chameleon Signature Generation–CHAM-SIG

Input of Signer: Message $m \in 2^*_q$ provide signing key of S, $SK_S$ $id_R$ and public key of R, $HK_R=y(=g^x$ and p).
1. Generate the chameleon hash of m by choosing a random $r \in Z^*_q$ and computing hash=$CHAM\text{-}HASH_R$ $(m,r)=g^m y^r$ mod p)
2. Set sig=$SIGH_S$(hash, $id_R$)
3. The signature on the message m consists of SIG(m)= (m,r,sig)

Chameleon Signature Verification—CHAM-VER

Input: SIG(m)=(m,r,sig) public verification key of S, $VK_S$ $id_R$ and public key of R, $HK_{R=y}$
1. Compute hash=$CHAM\text{-}HASH_R$(m,r)=$g^m y^r$ mod p
2.

$$\text{output} = \begin{cases} \text{proper} & VERIFY_S((\text{hash}, id_R), sig) = \text{valid} \\ \text{improper} & \text{otherwise} \end{cases}$$

As for the case of the claw-free based chameleon hashing, the non-exposure denial will be achieved by first extracting the trapdoor information, and then computing an unrelated collision. The chameleon hashing based on discrete log also has the property that given a collision in the hash enables to extract the trapdoor. Below shows the protocol for extracting the trapdoor and computing an unrelated collision.

Theorem 3 Assuming a secure digital signature scheme and the hardness of computing discrete logarithms modp, the above procedures form a chameleon signature scheme satisfying the properties of non-transferability, unforgeability, no-repudiation, denial, and exposure freeness.

Proof. We shall prove only the properties where the proof differs from the one of Theorem 1.

Non-transferability. Given a signature SIG=(m,r,sig) generated by the signer S for a recipient R, the recipient cannot convince a third part of its validity. This is due to the fact that for every possible message m', R can compute a value $$r' \stackrel{def}{=} \frac{m+xr-m'}{x}$$

mod q such that $CHAM\text{-}HASH_R$ (m,r)=$CHAM\text{-}HASH_R$(m', r'). Thus, (m',r', sig) is an (R,S) proper signature. Furthermore, since for every possible message m' there exists exactly one value r' that produces a proper triple (m',r', sig) then nothing is learned about the value of m from seeing the signature string sig. Thus non-transferability is achieved unconditionally, i.e. in the information theoretic sense. In addition, no third party can prove the validity of the signature at it may be assumed that he is in collusion with the recipient.

Generates Collision—Discrete Log Based

Input: a forgery SIG(m')=(m',r',sig)
1. S retrieves the original values m, r used to compute sig. It holds that $g^m y^r$ mod p=$g^{m'} g^{r'}$ mod p, while $m \neq m'^a$.

$^a$The retrieval of m and r can be done out of S's archives or using the encryption technique described in Section 3.2.

2. S computes $$x = \frac{m-m'}{r'-r} \mod q.$$

3. S chooses any message $\overline{m} \in Z^*_p$ and computes $$\overline{r} = \frac{m+xr-\overline{m}}{x} \mod q$$

4. Output $(\overline{m}, \overline{r})$.

Non-repudiation: Given an (R,S)-proper triple SIG(m)= (m,r,sig) generated by the signer, the signer cannot generate another (R,S)-proper triple SIG(m')=(m',r', sig) for $m \neq m'$ as this would be equivalent to computing the secret trapdoor information x, which we assume to be infeasible by the hardness of the discrete log problems.

Exposure freeness. Since we assume the underlying digital signature to be unforgeable, the signer S maybe required to deny a signature only for a triple SIG(m')= (m',r',sig) which is (R,S)-proper but not originally generated by S. In this case, S must possess another proper triple SIG(m)=(m,r,sig) that he really signed. Using these value S extracts the secret trapdoor information z of R by computing $$x = \frac{m-m'}{r'-r} \mod q.$$

Given this trapdoor the signer can deny the signature by presenting a collision using any message of his choice.

References

[AN95] R. Anderson and R. Needham, Robustness principles for public key protocols. In D. Coppersmith, editor, *Advances in Cryptology—Crypto '95*, pages 236–247, Berlin, 1995, Springer-Verlag, Lecture Notes in Computer Science No. 963.

[BCC88] G. Brassard, D. Chaum, and C. Crépeau. Minimum disclosure proofs of knowledge, JCSS, 37(2):156–89, 1988.

[BCDP90] J. Boyar, D. Chaum, I. DamgR ard, and T. Pedersen, Convertible undeniable signatures. In A. Menezes and S. Vanstone, editors, *Advances in Cryptology—Crypto '90*, pages 189–205, Berlin, 1990, Springer-Verlag, Lectures Notes in Computer Science No. 537.

[BKK90] J. F. Boyar, S. A. Kurtz, and M. W. Krentel. A discrete logarithm implementation of perfect zero-knowledge blobs. *Journal of Cryptology*, 2(2):63–76, 1990.

[CA89] David Chaum and Hans Van Antwerpen. Undeniable signatures. In G. Brassard, editor, *Advances in Cryptology—Crypto '89*, pages 212–217, Berlin, 1989, Springer-Verlag Lecture Notes in Computer Science No. 435.

[Cha] David Chaum. Private Signatures and Proof Systems, U.S. Pat. No. 5,493,614.

[Cha90] D. Chaum. Zero-knowledge undeniable signature. In I, DamgR and, editor, *Advances in Cryptology—Eurocrypt '90*, pages 458–464, Berlin, 1990, Springe-Verlag, Lecture Notes in Computer Science No. 472.

[Cha94] David Chaum. Designated confirmer signatures. In A. De Santis, editor, *Advantages in Cryptology—Eurocrypt –94*, pages 86–91, Berlin, 1994. Springer-Verlag. Lecture Notes in Computer Science No. 950.

[CvHP91] D. Chaum. E. van Heijst, and B. Pfitsmann. Cryptographically strong undeniable signatures, unconditionally secure for the signer. In J. Feigenbaum, editor, *Advances in Cryptology— Crypto '91*, pages 470–484, Berlin, 1991. Springer-Verlag Lecture Norton in Computer Science No. 576.

[Dam87] I. Damgard. Collision free hash functions. In D. Chaum. editor, *Advances in Cryptology—Eurocrypt '87*, pages 203–216, Berlin, 1987. Springer-Verlag. Lecture Notes in Computer Science No. 304.

[DP96] I. Damgard and T. Pedersen. New convertible undeniable signature schemes. In Ueli Maurer, editor, *Advances in Cryptology—Eurocrypt '96*, pages 372–386, Berlin, 1996. Springer-Verlag. Lectures Notes in Computer Sciences No. 1070.

[DY91] Y Desmedt and M. Yung. Weaknesses of undeniable signature schemes. In J. Feigenbaum, editor, *Advances in Cryptology—Crypto '91*, pages 205–220, Berlin, 1991. Springer-Verlag, Lectures Notes in Computer Science No. 576.

[POO91] A. Fujioka, T. Okamoto, and K. Ohta. Interactive bi-proof systems and undeniable signature schemes. In D. Davies, editor, *Advances in Cryptology—Eurocrypt '91*, pages 243–256, Berlin, 1991. Springer-Verlag. Lecture Notes in Computer Science No. 547.

[fST95] National Institute for Standards and Technology. Secure Hash Standard, April 17, 1995.

[GKR96] R. Gennaro, H. Krawczyk, and T. Rabin. Undeniable Certificates. Manuscript, 1996.

[GKR97] R. Gennaro, H. Krawczyk, and T. Rabin, RSA-based Undeniable Signatures. In B. Kaliski, editor, *Advances in Cryptology—Crypto '97*, pages 132–149, Berlin, 1997, Springer-Verlag Lecture Notes in Computer Science No. 1294.

[GM84] S. Goldwasser and S. Micali. Probabiliatic encryption. JCSS, 28(2):270–299, April 1984.

[GMR86] Shafi Goldwasser, Silvie Micali, and Ronald L. Rivest. A digital signature scheme secure against adaptive chosen-message attacks SIAM *J. Computing*, 17(2):281–308, Apr. 1984.

[JSI96] M. Jakobsson, K. Sakio, and R. Impagliazzo, Designated verifier proofs and their applications. In Ueli Maurer, editor, *Advances in Cryptology—Eurocrypt '96*, pages 143–154, Berlin, 1996. Springer-Verlag. Lecture Notes in Computer Science No. 1070.

[JY96] M. Jakobasson and M. Yung. Proving without knowning: On oblivious, agnostic and blind-folded provers, In N. Koblitz, editor, *Advances in Cryptology— Crypto '96* pages 201–215, Berlin, 1996. Springer-Verlag Lecture Notes in Computer Science No. 1109.

[Mic96] M. Michels. Breaking and repairing a convertible undeniable signature scheme. In ACM *Conference on Computer and Communications Security*, 1996.

[Oka94] Tatsuaki Okamoto. Designated confirmer signatures and public key encryption are equivalent. In Y. Desmedt, editor, *Advances in Cryptology—Crypto '94*, pages 61–74, Berlin, 1994, Springer-Verlag. Lecture Notes in Computer Science No. 839.

[Ped91] T. Pedersen. Distributed provers with applications to undeniable signatures. In D. Davies, editor, *Advances in Cryptology—Eurocrypt '91*, pages 221–242, Berlin, 1991. Springer-Verlag, Lecture Notes in Computer Science No. 547.

[PP97] T. Pedersen and B. Pfitsmann, Fail-stop signatures. SIAM. *J. Compulsing*, 26(2):291–330, April 1997.

[Rab78] M. Rabin. Digitalized Signatures, In R. Demillo and et al., editors, *Foundations of Secure Computations*, pages 155–165. Academic Press, 1978.

We claim:

1. A method for generating an undeniable certificate from a signer to a recipient wherein said signer sends said undeniable certificate thereby eliminating the need for a trusted third partly, said method comprising the steps of:

generating a first key pair for an undeniable signature scheme comprising a first private signing key and a corresponding first public verification key, said first public vertification key for verifying undeniable signatures generated under the first private signing key, generating a second key pair for a digital signature scheme comprising a second private signing key and a corresponding second public verification key, said second public verification key for verifying a signature on a message generated with the second private signing key;

signing said second public verification key by the signer using the first undeniable private signing key to generate an undeniable certificate of the second public verification key;

sending to the recipient said undeniable certificate of the second public verification key; and interacting in a confirmation protocol between said signer and said recipient, said signer needing no prior knowledge of said recipient, using the first undeniable public verification key to verify to the recipient that said undeniable certificate was signed using the first undeniable provide signing key, said recipient accepting or rejecting said undeniable certificate.

2. A method for generating an undeniable certificate from a signer to a recipient as recited in claim 1 wherein the interacting step comprises a single message from the signer to the recipient.

3. A method for generating an undeniable certificate from a signer to a recipient as recited in claim 1 wherein said undeniable signature scheme comprises a chameleon signature scheme.

4. A method for generating an undeniable certificate from a signer to a recipient as recited in claim 1 wherein said digital signature scheme is a chameleon signature scheme.

5. A method for generating an undeniable certificate from a signer to a recipient as recited in claim 2 wherein said digital signature scheme is a chameleon signature scheme.

6. A method for generating an undeniable signature from a signer to a recipient on a message, wherein said signer sends said undeniable certificate thereby eliminating the need for a trusted third party, comprising the steps:

generating a first key pair an undeniable signature scheme comprising a first private signing key and a corresponding first public vertification key, said first private signing key for verifying undeniable signatures generated under the first private signing key;

generating a second key pair for a digital signature scheme comprising a second private signing key and a corresponding public verification key, said second public verification key for verifying a signature on a message generated with the second private signing key;

signing said second public vertification key by the signer using the first undeniable private signing key to generate an undeniable certificate of the second public verification key;

sending to the recipient said undeniable certificate of the second public verification key;

interacting in a confirmation protocol between said signer and said recipient, said signer needing no prior knowledge of said recipient, using the first undeniable public verification key to verify to the recipient that said undeniable certificate was signed using the first undeniable private signing key, said recipient accepting or rejecting said undeniable certificate;

the signer signing a message to create a signature using the second signing key associated with the second verification key certified by said undeniable certificate; and the recipient verifying said signature with the second vertification key certified by said undeniable certificate.

7. A method for generating an undeniable signature from a signer to a recipient on a message as recited in claim 6 wherein the interacting step comprises a single message from the signer to the recipient.

8. A method for generating an undeniable signature from a signer to a recipient on a message as recited in claim 6 wherein said undeniable signature scheme comprises a chameleon signature scheme.

9. A method for generating an undeniable signature from a signer to a recipient on a message as recited in claim 6 wherein said digital signature scheme is a chameleon signature scheme.

10. A method for generating an undeniable signature from a signer to a recipient on a message as recited in claim 7 wherein said digital signature scheme is a chameleon signature scheme.

11. A computer readable medium containing code for operating a computer system to generate an undeniable certificates from a signer to a recipient thereby eliminating the need for a trusted third party, wherein said signer sends said undeniable certificate, said code implementing the steps of:

generating a first key pair for an undeniable signature scheme comprising a first private signing key and a corresponding first public verification key, said first public verification key for verifying undeniable signatures generated under the first private signing key;

generating a second key pair for a digital signature scheme comprising a second private signing key and a corresponding public verification key, said second public vertification key for verifying a signature on a message generated with the second private signing key;

allowing a signer to sign said second public verification key by the signer using the first undeniable private key to generate an undeniable certificate of the second public verification key;

sending to the recipient said undeniable certificate of the second public verification key; and implementing a confirmation protocol between said signer and said recipient, said signer needing no prior knowledge of said recipient, using the first undeniable public verification key to verify to the recipient that said undeniable certificate was signal using the first undeniable private signing key, said recipient accepting or rejecting said undeniable certificate.

12. A computer readable medium containing code for operating a computer system to generate an undeniable certificate from a signer to a recipient as recited in claim 11 wherein said confirmation protocol comprises a single message from the signer to the recipient.

13. A computer readable medium containing code for operating a computer system to generate an undeniable certificate from a signer to a recipient as recited in claim 11 wherein said undeniable signature scheme comprises a chameleon signature scheme.

* * * * *